US012208633B2

(12) United States Patent
Imai

(10) Patent No.: US 12,208,633 B2
(45) Date of Patent: Jan. 28, 2025

(54) PRINTER, HEATING DEVICE, AND PRINTING METHOD

(71) Applicant: Hiroyuki Imai, Kanagawa (JP)

(72) Inventor: Hiroyuki Imai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 177 days.

(21) Appl. No.: 17/985,135

(22) Filed: Nov. 10, 2022

(65) Prior Publication Data

US 2023/0220617 A1 Jul. 13, 2023

(30) Foreign Application Priority Data

Jan. 12, 2022 (JP) ................................ 2022-002994

(51) Int. Cl.

| | |
|---|---|
| ***B41J 3/407*** | (2006.01) |
| ***D06P 5/20*** | (2006.01) |
| ***D06P 5/30*** | (2006.01) |

(52) U.S. Cl.

CPC ........... *B41J 3/4078* (2013.01); *D06P 5/2072* (2013.01); *D06P 5/2077* (2013.01); *D06P 5/30* (2013.01)

(58) Field of Classification Search

CPC ..... B41J 3/4078; D06P 5/2072; D06P 5/2077; D06P 5/30

See application file for complete search history.

(56) References Cited

U.S. PATENT DOCUMENTS

| | | | | |
|---|---|---|---|---|
| 2009/0056582 | A1* | 3/2009 | Mizutani | B41J 3/4078 101/484 |
| 2016/0277602 | A1 | 9/2016 | Imai et al. | |
| 2019/0289161 | A1 | 9/2019 | Yoshigai | |
| 2021/0388560 | A1 | 12/2021 | Imai | |

FOREIGN PATENT DOCUMENTS

| | | | | |
|---|---|---|---|---|
| CN | 110621508 A * | 12/2019 | | B41J 11/007 |
| JP | 8-242386 | 9/1996 | | |
| JP | 2000-345436 | 12/2000 | | |
| JP | 2015-114426 | 6/2015 | | |
| JP | 2019-155765 | 9/2019 | | |

* cited by examiner

*Primary Examiner* — Justin Seo

(74) *Attorney, Agent, or Firm* — Duft & Bornsen, PC

(57) ABSTRACT

A printer includes: a print engine configured to discharge ink onto a fabric to print the fabric; a heating device configured to heat the fabric under a prescribed treatment condition; and circuitry configured to: set a type of the fabric; and acquire the prescribed treatment condition from an external device connected to the printer. The prescribed treatment condition includes: a temperature at which the heating device heats the fabric; and a duration of time during which the heating device heats the fabric, and the prescribed treatment condition is set for each types of fabrics.

20 Claims, 7 Drawing Sheets

FIG. 4

116a

| FABRIC | DETAILS | NON-CONTACT HEATING TEMPERATURE (°C) | NON-CONTACT HEATING TIME (sec) | CONTACT HEATING TEMPERATURE (°C) | CONTACT HEATING TIME (sec) |
|---|---|---|---|---|---|
| FABRIC 0001 | MANUFACTURER: AAA<br>PRODUCT NUMBER: XXXX | 200 | 100 | 200 | 100 |
| FABRIC 0002 | MANUFACTURER: AAA<br>PRODUCT NUMBER: XXXX | 220 | 120 | 200 | 60 |
| FABRIC 0003 | MANUFACTURER: BBB<br>PRODUCT NUMBER: XXXX | 180 | 150 | 150 | 180 |
| FABRIC 0004 | MANUFACTURER: BBB<br>PRODUCT NUMBER: XXXX | 200 | 180 | – | 0 |
| ⋮ | ⋮ | ⋮ | ⋮ | ⋮ | ⋮ |

PRINTER, HEATING DEVICE, AND PRINTING METHOD

CROSS-REFERENCE TO RELATED APPLICATIONS

This patent application is based on and claims priority pursuant to 35 U.S.C. § 119(a) to Japanese Patent Application No. 2022-002994, filed on Jan. 12, 2022, in the Japan Patent Office, the entire disclosure of which is hereby incorporated by reference herein.

BACKGROUND

Technical Field

The present disclosure relates to a printer, a heating device, and a printing method.

Related Art

A print processing apparatus performs a printing process on a fabric such as a garment. Such a print processing apparatus performs a heat treatment or the like so as to fix ink to the fabric. In this case, the print processing apparatus performs so-called non-contact heating in which the fabric onto which the ink has been discharged is heated by a heater or the like out of contact with the fabric, for example. Thereafter, the print processing apparatus performs so-called contact heating in which the heater or the like is brought into contact with the fabric. Such a technique improves the fixing properties of the ink and reduces heating time.

When it is determined that a predetermined time has elapsed in the heat treatment, the print processing apparatus controls to increase a temperature at which the heat treatment is performed to reduce power consumption.

SUMMARY

In an aspect of the present disclosure, a printer includes: a print engine configured to discharge ink onto a fabric to print the fabric; a heating device configured to heat the fabric under a prescribed treatment condition; and circuitry configured to: set a type of the fabric; and acquire the prescribed treatment condition from an external device connected to the printer. The prescribed treatment condition includes: a temperature at which the heating device heats the fabric; and a duration of time during which the heating device heats the fabric, and the prescribed treatment condition is set for each types of fabrics.

In another aspect of the present disclosure, a printing method includes discharging ink onto a fabric with a printer; heating the fabric under a prescribed treatment condition with the printer; setting a type of the fabric to the printer; and acquiring the prescribed treatment conditions from an external device connected to the printer. The prescribed treatment conditions includes: a temperature at which the heating heats the fabric; and a duration of time during which the heating heats the fabric, and the prescribed treatment condition is set for each types of fabrics.

In further another aspect of the present disclosure, a heating device includes: a heating device configured to heat a fabric onto which ink is discharged under a prescribed treatment condition; and circuitry configured to: set a type of the fabric; and acquire the prescribed treatment condition from an external device connected to the heating device. The prescribed treatment condition includes: a temperature at which the heating device heats the fabric; and a duration of time during which the heating device heats the fabric, and the prescribed treatment condition is set for each types of fabrics.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 4 is a table illustrating an example of a garment catalog;

Figure 1:
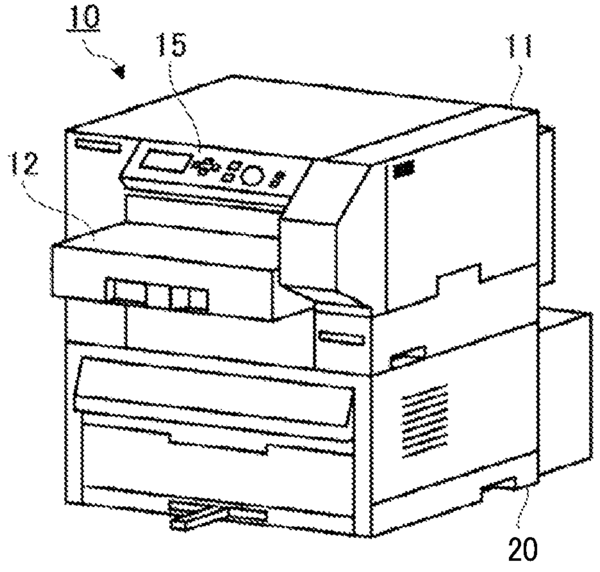
FIG. 1 is a diagram illustrating an example of a garment printer.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

First Embodiment

Hereinafter, embodiments of the present disclosure will be described with reference to the drawings. Note that the embodiments are not limited to specific examples to be described below.

Example of Print Processing Apparatus

FIG. 1 is a diagram illustrating an example of a garment printer. Hereinafter, a garment printer 10 illustrated in FIG. 1 will be described as an example of a print processing apparatus. Specifically, the garment printer 10 includes a print engine 11, a cassette 12, an operation panel 15, and a heating device 20. The garment printer 10 may be referred to simply as a "printer 10".

The print engine 11 performs a printing process by using a recording head or the like. In the printing process, the cassette 12 with a fabric placed on its upper surface is attached to the print engine 11. Then, the print engine 11 discharges ink from the recording head onto the fabric in accordance with a printing instruction input from the operation panel 15, an external device, or the like.

The heating device 20 adjusts to keep a heater in the heating device 20 at a predetermined temperature. In addition, the heating device 20 adjusts a distance between the accommodated cassette 12 and the heater. Thus, the heating device 20 switches between the heating of the fabric by means of the heater separated from the fabric (hereinafter referred to as "non-contact heating") and the heating of the fabric by means of the heater in contact with the fabric (hereinafter referred to as "contact heating") to perform a heat treatment.

A heating body is a heater or the like. The heating body may be a device other than the heater as long as the device can dry ink.

The contact heating is a treatment in which ink is quickly dried and fixed to the fabric.

The non-contact heating is a treatment in which the fabric is heated by the heater separated from the fabric. Therefore, it is possible to prevent adhesion of ink to the heater in the non-contact heating.

The predetermined treatment is a treatment including a heat treatment, and is performed separately from the printing process. For example, the predetermined treatment may include pretreatment. That is, the predetermined treatment is a treatment to be performed before or after the printing process. For example, the pretreatment refers to a treatment of applying chemicals to a fabric. In addition, since treatment conditions suitable for treatment such as the pretreatment differ between types of treatment, it is desirable to perform a treatment under treatment conditions suitable for each type. As described above, when a pretreatment or aftertreatment is performed on the fabric under suitable conditions separately from the printing process, the garment printer 10 can improve the quality of an image obtained in the printing process. Hereinafter, an example will be described in which the predetermined treatment includes a heat treatment.

The operation panel 15 is an input device that receives user inputs such as a printing instruction and a heating instruction. The operation panel 15 is an output device that displays information such as a status of the garment printer 10 including the print engine 11, the heating device 20, and the like, or a result of printing performed by the garment printer 10.

Figure 2:
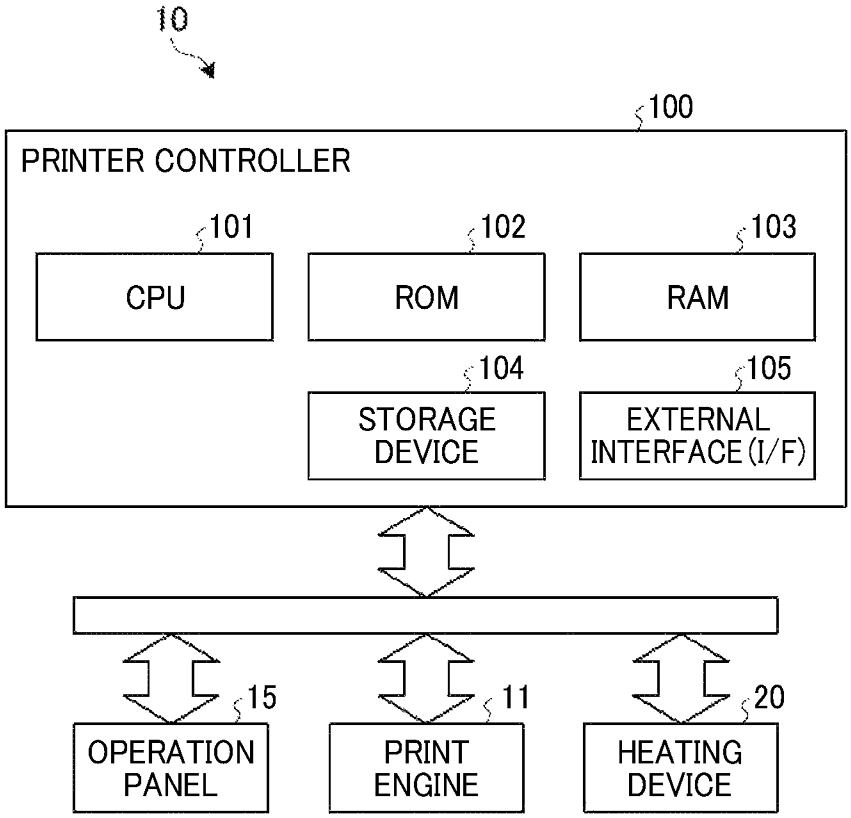
FIG. 2 is a diagram illustrating a hardware configuration example of the garment printer.

FIG. 2 is a diagram illustrating a hardware configuration example of the garment printer. As illustrated in FIG. 2, the garment printer 10 further includes a printer controller 100 that controls each unit of the garment printer 10.

The printer controller 100 includes a central processing unit (hereinafter referred to as "CPU 101"), a read only memory (hereinafter referred to as "ROM 102"), a random-access memory (hereinafter referred to as "RAM 103"), a storage device 104, and an external interface (I/F) (hereinafter referred to as "external I/F 105").

The CPU 101 serves as an example of circuitry. The CPU 101 uses the RAM 103 as a work area, and executes a program stored in, for example, the ROM 102. Thus, the CPU 101 controls input and output of various types of information performed on the operation panel 15. In addition, the CPU 101 performs, on the fabric, processes such as a predetermined treatment and a printing process on the basis of a user's instruction input from the operation panel 15 or the like.

The CPU 101 causes the print engine 11 to discharge ink onto the fabric to perform the printing process. In addition, the CPU 101 causes the heating device 20 to perform a heat treatment or the like on the fabric.

The storage device 104 is, for example, an auxiliary storage device such as a hard disk drive (HDD) or a solid-state drive (SSD).

The external I/F 105 implements communication between the garment printer 10 and an external device. The communication is performed via, for example, a network or a cable.

Configuration Example of Print Processing System

Figure 3:
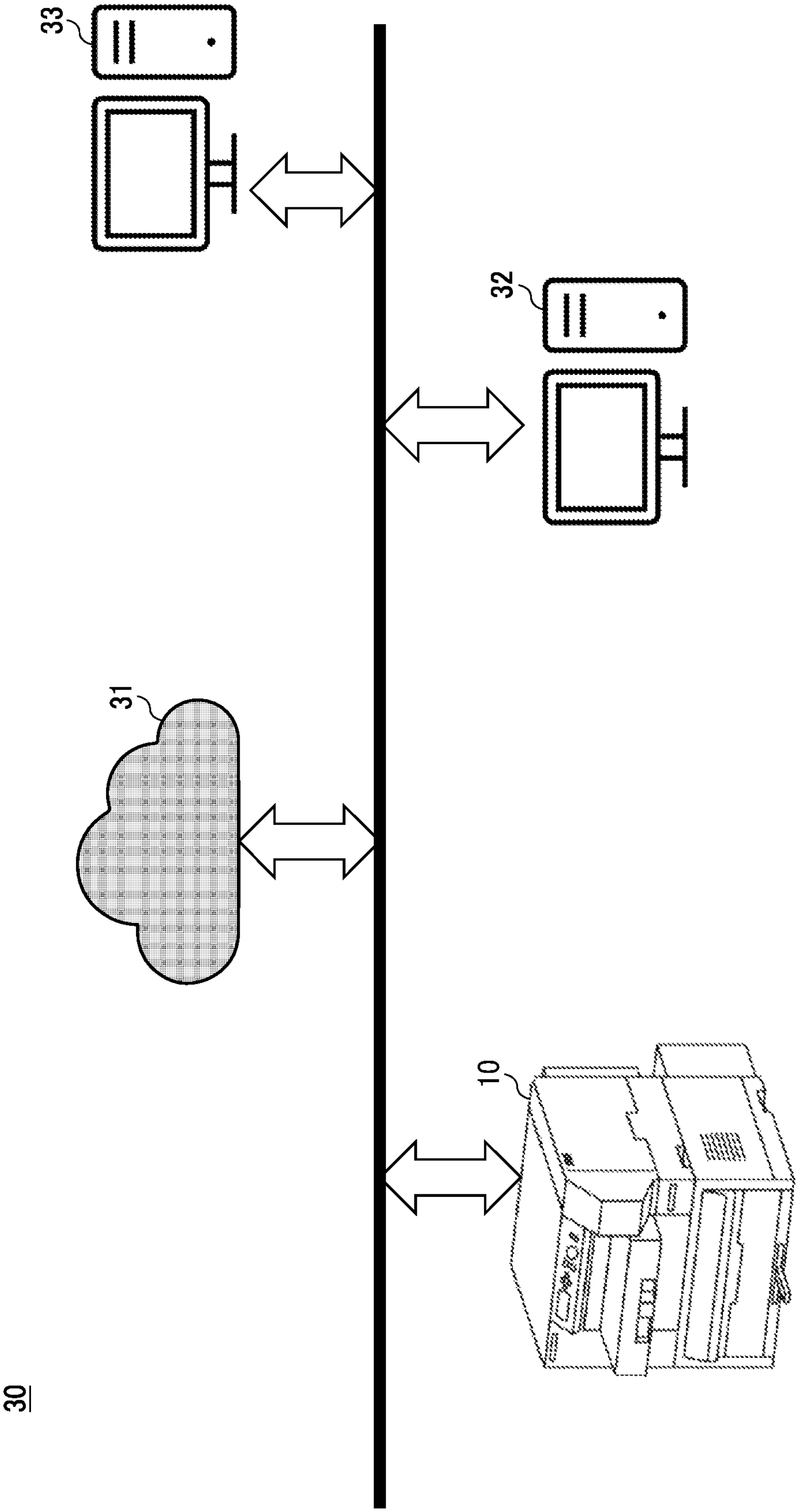
FIG. 3 is a diagram illustrating an example of a print processing system.

FIG. 3 is a diagram illustrating an example of a print processing system. For example, a print processing system 30 is a system in which the garment printer 10, a cloud 31, a user terminal 32, and the like are connected via a network. The print processing system 30 may further include a device.

The cloud 31 is an example of a first external device. That is, the cloud 31 refers to a single or plurality of information processing devices.

The user terminal 32 is an example of a second external device. Specifically, the user terminal 32 refers to an information processing device such as a personal computer (PC).

The cloud 31 stores data indicating treatment conditions for the predetermined treatment (hereinafter, referred to as "garment catalog") and the like. For example, the garment catalog is uploaded from a manufacturer terminal 33 or the like to the cloud 31.

Example of Garment Catalog

FIG. 4 is a table illustrating an example of the garment catalog. Specifically, as illustrated in FIG. 4, a garment catalog **116*a* indicates treatment conditions for the predetermined treatment for each type. Specifically, the treatment conditions are input to the garment catalog 116*a*** in association with reference numbers set for fabrics.

The column "fabric" indicates reference numbers for identifying types.

The column "details" indicates descriptions of each fabric. Specifically, "manufacturers", "product numbers", and the like are input into the column "details".

The columns "non-contact heating temperature" and "non-contact heating time" indicate treatment conditions for non-contact heating.

The columns "contact heating temperature" and "contact heating time" indicate treatment conditions for contact heating.

The columns "non-contact heating temperature" and "contact heating temperature" indicate temperatures at which a heat treatment is performed. Thus, the garment printer 10 controls the heater or the like such that a heat treatment is performed at an input temperature.

The columns "non-contact heating time" and "contact heating time" indicate the duration of time during which a heat treatment is performed.

When the "contact heating temperature" is set to "–" and the "contact heating time" is set to "0", no contact heating treatment is performed. Meanwhile, when treatment conditions for both the non-contact heating and the contact heating are input, the garment printer 10 performs the non-contact heating and the contact heating in combination.

Appropriate values are set as temperature and time for each type in terms of, for example, the fixing properties of ink, the efficiency of heat treatment, and prevention of the fading of fabric. Based on the treatment conditions indicated by the garment catalog 116*a* as described above, the garment printer 10 performs a heat treatment according to a type.

The format of the garment catalog 116*a* is not limited to the format illustrated in FIG. 4. That is, the format of data in the garment catalog 116*a* is not limited as long as treatment conditions for each type can be specified. For example, in a case where the non-contact heating and the contact heating are performed in combination, whether the non-contact heating or the contact heating is performed first may be further set.

The garment catalog 116*a* includes items corresponding to details of treatment. Therefore, when treatment other than the heat treatment is performed, the garment catalog 116*a* may indicate treatment conditions other than the treatment conditions described above.

Thus, the garment catalog 116*a* indicates so-called recommended conditions.

For example, the garment catalog 116*a* is generated by the manufacturer terminal 33. Thereafter, the garment catalog 116*a* is uploaded to the cloud 31. When accessing the cloud 31, it is possible to wholly or partially acquire the garment catalog 116*a*. Note that the garment catalog 116*a* may be updated by an information processing device other than the manufacturer terminal 33.

Example of Overall Processing

Figure 5:
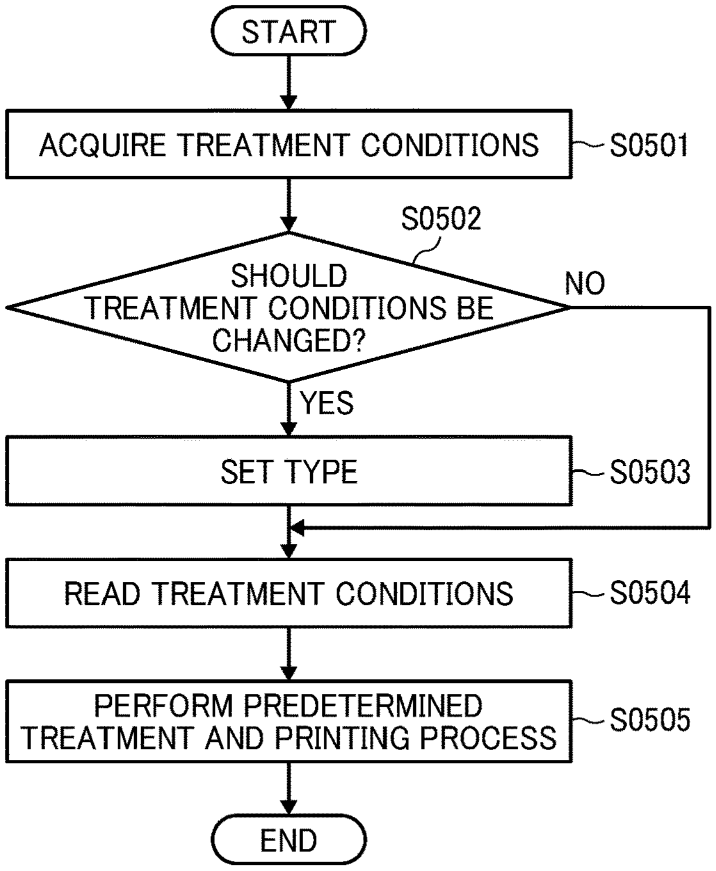
FIG. 5 is a diagram illustrating an example of overall processing.

FIG. 5 is a diagram illustrating an example of overall processing.

In step S0501, the garment printer 10 acquires treatment conditions. Specifically, the garment printer 10 acquires the garment catalog 116*a* from the cloud 31.

In step S0502, the garment printer 10 determines whether to change the treatment conditions. For example, treatment conditions are set in advance as initial values in the garment printer 10. Then, the garment printer 10 displays, on the operation panel 15, the treatment conditions set as initial values in advance as treatment conditions currently being selected. Furthermore, the garment printer 10 allows the user to choose whether to perform treatment under the treatment conditions currently being selected, on the operation panel 15. The garment printer 10 determines whether to change the treatment conditions, based on a result of the choice.

Figure 6:
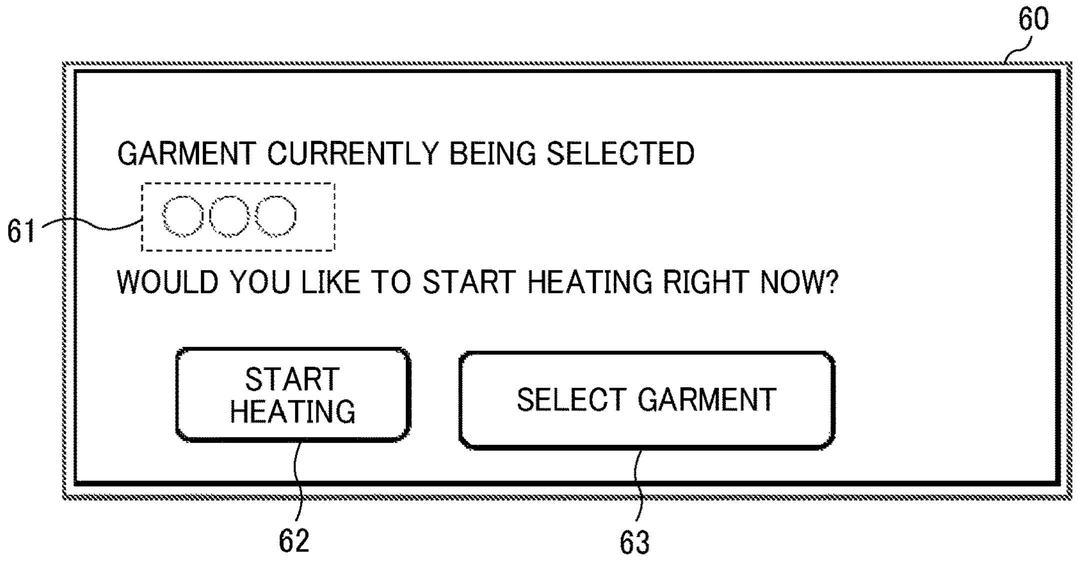
FIG. 6 is a diagram illustrating an example of display to be provided on an operation panel.

FIG. 6 is a diagram illustrating an example of display to be provided on the operation panel. For example, step S0502 is processing to be executed on the basis of a result of a user operation performed on a first operation screen 60. That is, the first operation screen 60 is displayed on the operation panel 15.

The first operation screen 60 includes a selected type indication 61, a start button 62, and a selection button 63.

The selected type indication 61 indicates a type currently being selected. That is, the operation panel 15 illustrates to the user whether to perform the predetermined treatment under treatment conditions corresponding to the type indicated by the selected type indication 61.

The start button 62 causes the predetermined treatment to be performed under the treatment conditions corresponding to the type currently being selected. Therefore, when the start button 62 is pressed, the garment printer 10 determines not to change the treatment conditions (NO in step S0502).

The selection button 63 is a button to be pressed when the printing process is performed under treatment conditions different from the treatment conditions corresponding to the type currently being selected, that is, when the printing process is performed for a type different from the type currently being selected (YES in step S0502).

Next, when determining to change the treatment conditions (YES in step S0502), the garment printer 10 proceeds to step S0503. Meanwhile, when determining not to change the treatment conditions (NO in step S0502), the garment printer 10 proceeds to step S0504.

In step S0503, the garment printer 10 sets a type. Specifically, data indicating the type of fabric to be subjected to the printing process are input to the garment printer 10 to specify the type of fabric to be subjected to the printing process. Therefore, after the setting of a type, the garment printer 10 is in a state where it is possible to acquire treatment conditions and the like according to the type.

Figure 7:
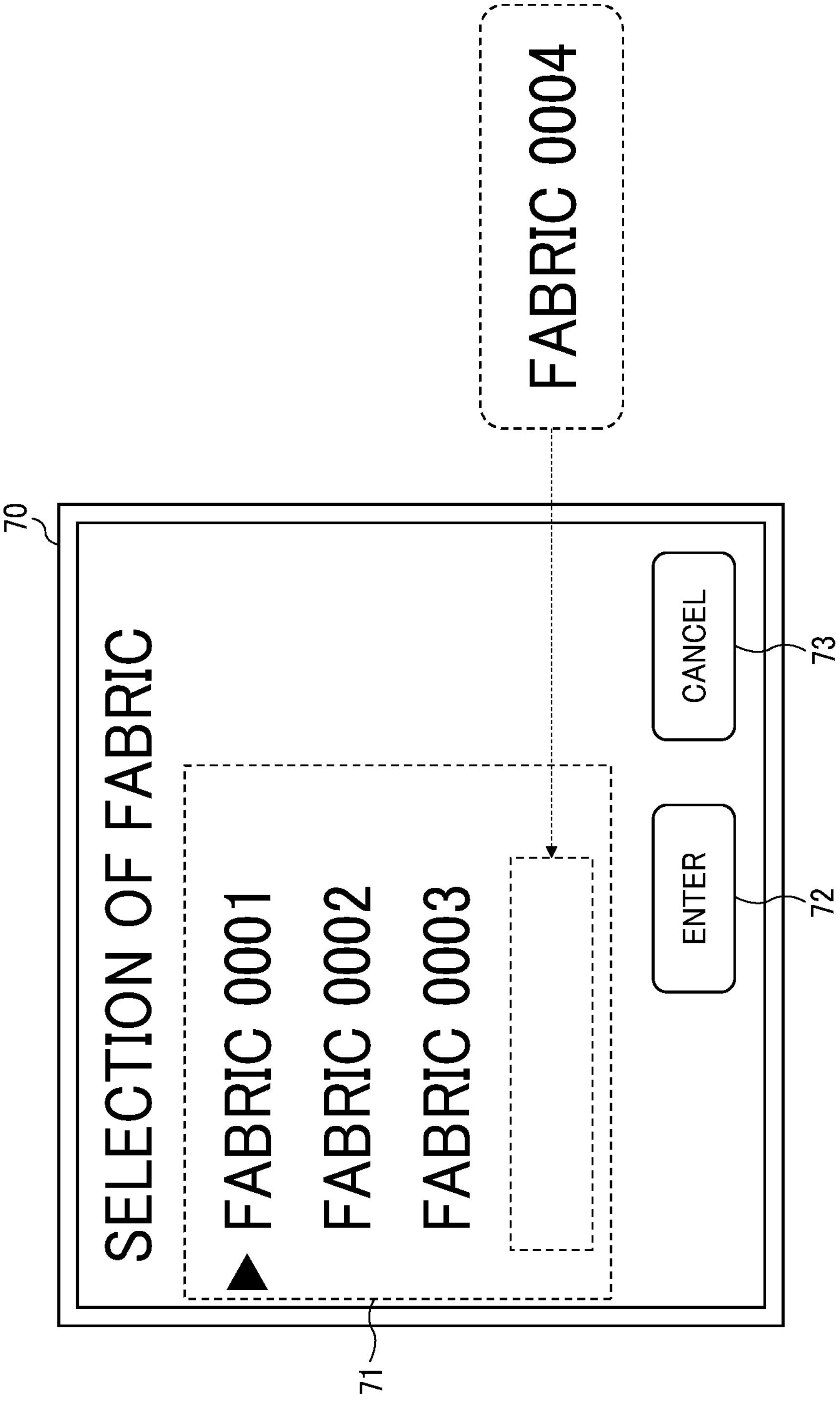
FIG. 7 is a diagram illustrating an example of display to be provided on a setting screen.

FIG. 7 is a diagram illustrating an example of display to be provided on a setting screen. For example, step S0503 is processing to be executed on the basis of a result of a user operation performed on a second operation screen 70. That is, the second operation screen 70 is displayed on the operation panel 15.

The second operation screen 70 includes a type setting button 71, an enter button 72, and a cancel button 73.

The type setting button 71 is a button for selecting a type to be subjected to the printing process. Therefore, a type selected by means of the type setting button 71 is set (step S0503). Thus, the garment printer 10 acquires predetermined conditions suitable for the type selected by means of the type setting button 71.

The enter button 72 is a button for accepting an operation for finalizing the type selected by means of the type setting button 71.

The cancel button 73 is a button for accepting an operation for canceling a type selection.

It is desirable that a means such as the type setting button 71 be provided which allows the user to select a type instead of specifying treatment conditions. For example, it is easier for the user to set predetermined conditions suitable for the type than in a case where the user inputs conditions such as time and temperature.

When the garment catalog 116*a* can be acquired, the user can also select a type other than types set in advance. Hereinafter, a case where types "0001" to "0003" are set in advance will be described as an example. In the case where the types "0001" to "0003" are set in advance, three types of fabric are displayed as choices on the type setting button 71 according to the settings made in advance, as illustrated in FIG. 7.

Assume that a type "0004" has been newly added after the settings made in advance. Even in such a case, if the garment catalog 116*a* illustrated in FIG. 4, that is, a garment catalog including information on the types "0001" to "0004" can be acquired, the type "0004" can be selected by means of the type setting button 71.

That is, when the garment catalog 116*a* is acquired, the garment printer 10 can perform the predetermined treatment under predetermined conditions suitable for the type "0004". Therefore, the garment printer 10 can perform the predetermined treatment under treatment conditions suitable for any of the four types including the type "0004".

In step S0504, the garment printer 10 reads predetermined conditions. That is, the garment printer 10 prepares for processes to be performed thereafter, such as a predetermined treatment and a printing process. Therefore, step S0504 may include processing other than the reading of predetermined conditions.

In step S0505, the garment printer 10 performs the predetermined treatment and the printing process. That is, the predetermined treatment is performed in step S0505 under predetermined conditions suitable for the type.

Modification

Whether to change treatment conditions may be determined not on the basis of an operation, that is, a user operation performed by use of the first operation screen 60. For example, the garment printer 10 may determine a type by means of artificial intelligence (AI) or the like. First, the garment printer 10 includes a sensor that detects a type. The sensor then senses a fabric so as to determine its type. The type may be set on the basis of a result of detection performed by such a sensor. Specifically, when there is a tag on the fabric, the garment printer 10 recognizes characters and the like written on the tag, to specify a type.

Thus, as long as a type can be specified, the garment printer 10 may include any sensor, and may perform any kind of processing for making determination.

Second Embodiment

A second embodiment can be implemented by a print processing system 30 and a garment printer 10 similar to the print processing system 30 and the garment printer 10 of the first embodiment. Meanwhile, the second embodiment is different from the first embodiment in that a type is set by a second external device.

The second external device is, for example, a user terminal 32. However, the second external device may be an information processing device other than the user terminal 32. Hereinafter, an example will be described in which the second external device is the user terminal 32.

Figure 8:
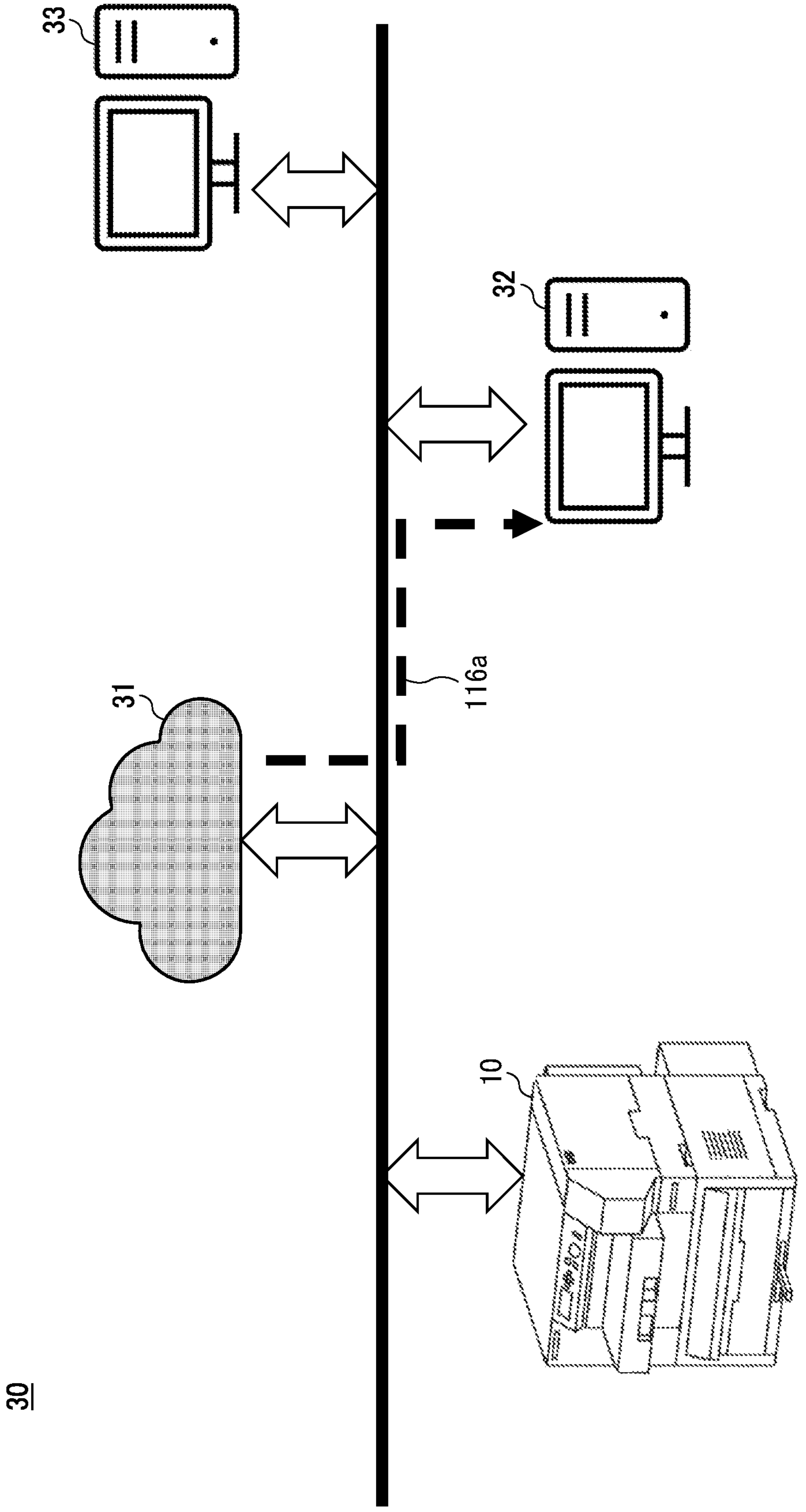
FIG. 8 is a diagram illustrating a configuration example of a print processing system according to a second embodiment.

FIG. 8 is a diagram illustrating a configuration example of the print processing system according to the second embodiment. In the second embodiment, a garment catalog 116*a* is transmitted from a cloud 31 to the user terminal 32. Thus, the user terminal 32 can display, for example, the second operation screen 70 illustrated in FIG. 7 for a user.

Therefore, the user can select a type on the user terminal 32 in the second embodiment. In the second embodiment, the user terminal 32 acquires the garment catalog 116*a*. Therefore, the garment printer 10 can reduce a storage area. Accordingly, the cost of the garment printer 10 can be reduced.

The user terminal 32 receives a user operation of selecting a type through a user interface (UI) implemented by a printer driver. Thereafter, the user terminal 32 acquires the garment catalog 116*a*. Next, the user terminal 32 transmits a setting result as a command to the garment printer 10.

The garment printer 10 performs a predetermined treatment under predetermined conditions based on the transmitted command, and also performs a printing process. Therefore, the user can make settings for the garment printer 10 by means of the user terminal 32. As a result, the user can make settings for the garment printer 10 without visiting a location where the garment printer 10 is installed.

Functional Configuration

Figure 9:
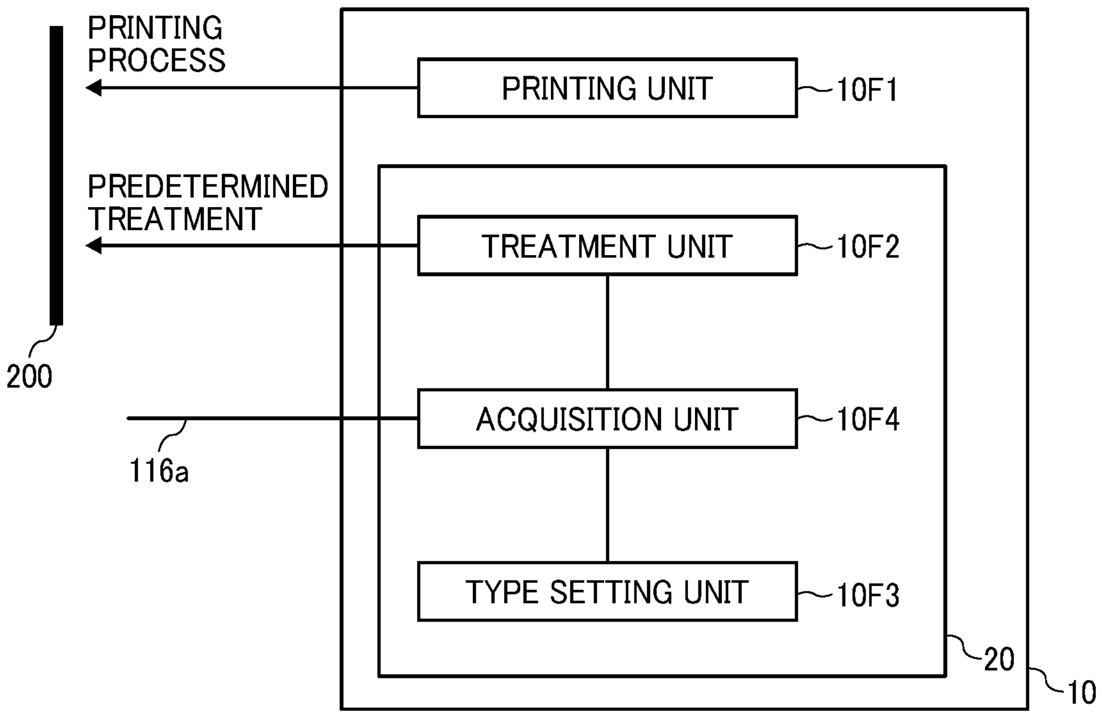
FIG. 9 is a diagram illustrating a functional configuration according to an embodiment of the present disclosure.

FIG. 9 is a diagram illustrating an example of a functional configuration. The garment printer 10 includes a printing unit 10F1, a treatment unit 10F2, a type setting unit 10F3, and an acquisition unit 10F4.

The printing unit 10F1 performs a printing step of discharging ink onto a fabric 200 to perform a printing process. For example, the printing unit 10F1 is implemented by a print engine 11 or the like.

The treatment unit 10F2 performs a treatment step of performing a predetermined treatment on the fabric 200 under treatment conditions. For example, the treatment unit 10F2 is implemented by a printer controller 100 or the like.

The type setting unit 10F3 performs a type setting step of setting the type of fabric 200. For example, the type setting unit 10F3 is implemented by the printer controller 100 or the like.

The acquisition unit 10F4 performs an acquisition step of acquiring treatment conditions from a first external device. For example, the acquisition unit 10F4 is implemented by the printer controller 100 or the like.

With the configuration as described above, the garment printer 10 can acquire treatment conditions from the first external device. In this manner, treatment conditions suitable for each type can be acquired via a network. As a result, it is possible to add treatment conditions for any type other than types set in the garment printer 10 in advance. Therefore, the predetermined treatment can be performed under conditions suitable for the type. Specifically, if the garment catalog 116*a* cannot be acquired, types to which the garment printer 10 is applicable are fixed to initially set types. Therefore, the garment printer 10 is configured such that the garment catalog 116*a* can be acquired from the first external device. As a result, even if there are improved treatment conditions or new types, the garment printer 10 can add or update predetermined conditions to acquire treatment conditions suitable for the types.

Other Embodiment

Examples of fabric include a handkerchief, a towel, a T-shirt, and a tote bag. Meanwhile, examples of the fabric are not limited to these products.

A print processing method may be implemented by a program. In addition, a garment catalog 116*a* is provided, for example, after being stored in a recording medium or the like so that the garment catalog 116*a* can be read by a computer. Examples of the recording medium include a magnetic disk, an optical disk, a magneto-optical disk, and a flash memory. In addition, the program and data such as the garment catalog 116*a* may be downloadable from a server or the like located on a network.

A print engine 11 and a heating device 20 may be controlled by different controllers. Each controller is a computer including a central processing unit (CPU), a read only memory (ROM), a random-access memory (RAM), a storage device, and an external interface (I/F).

The above-described print processing method may be partially or wholly implemented by an electronic circuit such as an application specific integrated circuit (ASIC).

Any one of the above-described operations may be performed in various other ways, for example, in an order different from the one described above. The methods described above can be provided as program codes stored in a recording medium, to cause a processor to execute the method when executed by at least one processor.

Each of the functions of the described embodiments such as CPU 101 may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

[Aspect 1]

A printer includes: a print engine configured to discharge ink onto a fabric to print the fabric; a heating device configured to heat the fabric under a prescribed treatment condition; and circuitry configured to: set a type of the fabric; and acquire the prescribed treatment condition from an external device connected to the printer. The prescribed treatment condition includes: a temperature at which the heating device heats the fabric; and a duration of time during which the heating device heats the fabric, and the prescribed treatment condition is set for each types of fabrics.

[Aspect 2]

In the printer according to aspect 1, the circuitry: acquires a result of a setting of the types of fabrics from another external device connected to the printer; and sets the types of fabrics to the heating device based on the result of the setting.

[Aspect 3]

In the printer according to aspect 1, the heating device includes a heater and performs any one of: a non-contact heating to heat the fabric while the heater is separated from the fabric; a contact heating to heat the fabric while the heater contacts the fabric; or a combination of the non-contact heating and the contact heating.

[Aspect 4]

In the printer according to aspect 3, the heating device heats the fabric before or after printing the fabric, the circuitry acquire data including the prescribed treatment condition from the external device, and cause the heating device to heat the fabric under the prescribed treatment condition in which the temperature and the duration of time suitable for the types of fabrics are defined.

[Aspect 5]

In the printer according to aspect 4, the data includes a garment catalog indicating the prescribed treatment condition for each of the types of fabrics.

[Aspect 6]

A printing method includes discharging ink onto a fabric with a printer; heating the fabric under a prescribed treatment condition with the printer; setting a type of the fabric to the printer; and acquiring the prescribed treatment conditions from an external device connected to the printer. The prescribed treatment conditions includes: a temperature at which the heating heats the fabric; and a duration of time during which the heating heats the fabric, and the prescribed treatment condition is set for each types of fabrics.

[Aspect 7]

In the printing method according to aspect 6, the external device is a cloud to which the prescribed treatment condition is uploaded from another external device connected to the cloud; and the acquiring acquires the prescribed treatment condition from the cloud.

[Aspect 8]

A heating device includes: a heating device configured to heat a fabric onto which ink is discharged under a prescribed treatment condition; and circuitry configured to: set a type of the fabric; and acquire the prescribed treatment condition from an external device connected to the heating device. The prescribed treatment condition includes: a temperature at which the heating device heats the fabric; and a duration of time during which the heating device heats the fabric, and the prescribed treatment condition is set for each types of fabrics.

Numerous additional modifications and variations are possible in light of the above teachings. It is therefore to be understood that, within the scope of the above teachings, the present disclosure may be practiced otherwise than as specifically described herein. With some embodiments having thus been described, it is obvious that the same may be varied in many ways. Such variations are not to be regarded as a departure from the scope of the present disclosure and appended claims, and all such modifications are intended to be included within the scope of the present disclosure and appended claims.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The invention claimed is:

1. A system comprising:

a print engine configured to discharge ink onto a fabric to print the fabric;

a heating device configured to heat the fabric under a prescribed treatment condition; and circuitry configured to:

set a type of the fabric; and acquire the prescribed treatment condition from a first external device connected to the printer, wherein the prescribed treatment condition includes:

a temperature at which the heating device heats the fabric; and a duration of time during which the heating device heats the fabric, the prescribed treatment condition is set for each of a number of types of fabrics, the first external device is a cloud to which the prescribed treatment condition is uploaded from a second external device connected to the cloud, and the circuitry is configured to acquire the prescribed treatment condition from the cloud.

2. The system according to claim 1, wherein the circuitry is configured to:

acquire a result of a setting of the types of fabrics from a third external device connected to the printer; and set the types of fabrics to the heating device based on the result of the setting.

3. The system according to claim 1, wherein the heating device includes a heater and performs any one of:

a non-contact heating to heat the fabric while the heater is separated from the fabric;

a contact heating to heat the fabric while the heater contacts the fabric; or a combination of the non-contact heating and the contact heating.

4. The system according to claim 3, wherein the heating device heats the fabric before or after printing the fabric, and wherein the circuitry is configured to:

acquire data including the prescribed treatment condition from the cloud, and cause the heating device to heat the fabric under the prescribed treatment condition in which the temperature and the duration of time suitable for the types of fabrics are defined.

5. The system according to claim 4, wherein the data includes a garment catalog indicating the prescribed treatment condition for each of the types of fabrics.

6. A printing method comprising:
discharging ink onto a fabric with a printer;
heating the fabric under a prescribed treatment condition with the printer;
setting a type of the fabric to the printer; and
acquiring the prescribed treatment condition from a first external device connected to the printer, wherein
the prescribed treatment condition includes:
a temperature at which the heating heats the fabric; and
a duration of time during which the heating heats the fabric,
the prescribed treatment condition is set for each of a number of types of fabrics,
the first external device is a cloud to which the prescribed treatment condition is uploaded from a second external device connected to the cloud, and
the acquiring comprises acquiring the prescribed treatment condition from the cloud.

7. The printing method according to claim 6, wherein the heating device includes a heater and performs any one of:
a non-contact heating to heat the fabric while the heater is separated from the fabric;
a contact heating to heat the fabric while the heater contacts the fabric; or
a combination of the non-contact heating and the contact heating.

8. A system comprising:
a heating device configured to heat a fabric onto which ink is discharged under a prescribed treatment condition; and
circuitry configured to:
set a type of the fabric; and
acquire the prescribed treatment condition from a first external device connected to the heating device, wherein
the prescribed treatment condition includes:
a temperature at which the heating device heats the fabric; and
a duration of time during which the heating device heats the fabric,
the prescribed treatment condition is set for each of a number of types of fabrics,
the first external device is a cloud to which the prescribed treatment condition is uploaded from a second external device connected to the cloud, and
the circuitry is configured to acquire the prescribed treatment condition from the cloud.

9. The system according to claim 8, wherein the system includes a heater and performs any one of:
a non-contact heating to heat the fabric while the heater is separated from the fabric;
a contact heating to heat the fabric while the heater contacts the fabric; or
a combination of the non-contact heating and the contact heating.

10. The system according to claim 9, wherein the system heats the fabric before or after printing the fabric, and
wherein the circuitry is configured to:
acquire data including the prescribed treatment condition from the cloud, and
cause the system to heat the fabric under the prescribed treatment condition in which the temperature and the duration of time suitable for the types of fabrics are defined.

11. The system according to claim 10, wherein the data includes a garment catalog indicating the prescribed treatment condition for each of the types of fabrics.

12. The system according to claim 1, wherein the circuitry is configured to receive a selection of the type of the fabric from a user through an operation screen.

13. The system according to claim 1, further comprising:
a sensor configured to determine the type of the fabric.

14. The system according to claim 1, wherein the circuitry is configured to use artificial intelligence to determine the type of the fabric.

15. The printing method according to claim 6, wherein the heating is performed before or after discharging the ink onto the fabric with the printer.

16. A system comprising:
a cloud; and
a printer comprising:
a print engine configured to discharge ink onto a fabric to print the fabric;
a heating device configured to heat the fabric under a prescribed treatment condition; and
circuitry configured to:
set a type of the fabric; and
acquire the prescribed treatment condition from the cloud connected to the printer, wherein
the prescribed treatment condition includes:
a temperature at which the heating device heats the fabric; and
a duration of time during which the heating device heats the fabric,
the prescribed treatment condition is set for each of a number of fabrics, and
the prescribed treatment condition is uploaded from an external device connected to the cloud.

17. The system according to claim 16, wherein the heating device includes a heater and performs any one of:
a non-contact heating to heat the fabric while the heater is separated from the fabric;
a contact heating to heat the fabric while the heater contacts the fabric; or
a combination of the non-contact heating and the contact heating.

18. The system according to claim 17, wherein the heating device heats the fabric before or after printing the fabric, and
wherein the circuitry is configured to:
acquire data including the prescribed treatment condition from the cloud, and
cause the heating device to heat the fabric under the prescribed treatment condition in which the temperature and the duration of time suitable for the types of fabrics are defined.

19. The system according to claim 18, wherein the data includes a garment catalog indicating the prescribed treatment condition for each of the types of fabrics.

20. The system according to claim 16, wherein the printer comprises a garment printer.

* * * * *